United States Patent
Oesterling et al.

(10) Patent No.: US 7,953,528 B2
(45) Date of Patent: May 31, 2011

(54) SMS AND PACKET DATA PERFORMANCE MONITORING

(75) Inventors: Christopher L. Oesterling, Troy, MI (US); Richard F. Heines, Ortonville, MI (US); Sam S. Chang, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 676 days.

(21) Appl. No.: 11/963,148

(22) Filed: Dec. 21, 2007

(65) Prior Publication Data

US 2009/0164551 A1     Jun. 25, 2009

(51) Int. Cl.
*G06F 7/00* (2006.01)

(52) U.S. Cl. .......... 701/29; 701/1; 701/2; 701/200; 701/210; 701/213; 455/423; 455/466

(58) Field of Classification Search .......... 701/1, 29
See application file for complete search history.

(56) References Cited

U.S. PATENT DOCUMENTS

| | | | | |
|---|---|---|---|---|
| 7,043,357 B1* | 5/2006 | Stankoulov et al. | .......... | 701/200 |
| 7,327,280 B2* | 2/2008 | Bachelder et al. | .......... | 340/906 |
| 7,590,489 B2* | 9/2009 | Auger et al. | .......... | 701/210 |
| 7,629,924 B2* | 12/2009 | Huang et al. | .......... | 342/357.02 |
| 2002/0005802 A1* | 1/2002 | Bryant et al. | .......... | 342/357.01 |
| 2002/0032853 A1* | 3/2002 | Preston et al. | .......... | 713/151 |
| 2002/0053985 A1* | 5/2002 | Nesbitt | .......... | 340/994 |
| 2002/0177448 A1* | 11/2002 | Moran et al. | .......... | 455/456 |
| 2003/0073406 A1* | 4/2003 | Benjamin et al. | .......... | 455/41 |
| 2004/0203850 A1* | 10/2004 | Oesterling | .......... | 455/456.1 |
| 2005/0203677 A1* | 9/2005 | Auger et al. | .......... | 701/16 |
| 2006/0250965 A1* | 11/2006 | Irwin | .......... | 370/238 |
| 2007/0066276 A1* | 3/2007 | Kuz et al. | .......... | 455/404.1 |
| 2007/0082689 A1* | 4/2007 | Talty et al. | .......... | 455/518 |
| 2007/0118286 A1* | 5/2007 | Wang et al. | .......... | 701/213 |
| 2007/0152877 A1* | 7/2007 | Madhaven et al. | .......... | 342/357.02 |
| 2007/0230413 A1* | 10/2007 | Gandhi et al. | .......... | 370/338 |
| 2008/0046135 A1* | 2/2008 | Farrow | .......... | 701/2 |
| 2008/0139196 A1* | 6/2008 | Zhang et al. | .......... | 455/423 |

* cited by examiner

*Primary Examiner* — Khoi Tran
*Assistant Examiner* — Jonathan L Sample
(74) *Attorney, Agent, or Firm* — Anthony Luke Simon; Reising Ethington P.C.

(57) ABSTRACT

A system and method for monitoring data transfer performance between a central facility and a vehicle that includes calculating the message latency between the transmission and receipt of a message from a call center to the vehicle, or vice-versa. The information can be used to generate a latency map that is useful in diagnosing wireless system problems and in deciding when and how to communicate with a vehicle depending upon its location.

19 Claims, 4 Drawing Sheets

SMS AND PACKET DATA PERFORMANCE MONITORING

TECHNICAL FIELD

The present invention generally relates to a method for monitoring the communication of data and, more particularly, to a communications method that monitors the latency of messages sent to a vehicle equipped with wireless telephony and wireless networking communications devices.

BACKGROUND

Modern vehicles frequently use and generate a great deal of data. This data is wirelessly sent to and received from with a variety of sources via a vehicle telematics unit that uses wireless telephony and/or packet data communication. Often, a central facility needs data or desires that the vehicle perform an action. The central facility sends a request to a vehicle and waits for a response. The central facility may accomplish this request by sending a message to the vehicle. In some modes of communication, such as by using SMS, these messages are of the "send and forget" variety and allow the facility no mechanism to ensure the vehicle received its message. Even if the message could be confirmed as delivered, the delivery may be delayed under some conditions and central facility may not be able to determine the latency or efficiency of message delivery. Conditions such congestion experienced by the wireless carrier, or as the result of location of the vehicle, may affect the speed of delivery. It is possible for the central facility to repeatedly send messages to the vehicle until the facility receives a response. This can be advantageous due to cost and can result in unnecessary messages that slow wireless networks and potentially cause communication confusion.

SUMMARY OF THE INVENTION

According to one aspect of the invention, there is provided a method for monitoring data transfer performance. The method includes the steps of: (a) receiving a message at a vehicle; (b) determining a receipt time indicating when the message was received at the vehicle; and (c) sending latency information to a central facility, the latency information being indicative of a message latency representing the difference between the receipt time and when the message was sent to the vehicle.

According to another aspect of the invention, there is provided a method for monitoring data transfer performance. The method includes the steps of: (a) wirelessly initiating a communication from each of a plurality of vehicles to a central facility; (b) recording the initiation time at which each communication was initiated; (c) recording the location of the vehicle at the time the communication was initiated; (d) sending the initiation time and location to the central facility; (e) determining a message latency indicative of the difference in time between when the communication was initiated and when the initiation time and location was received at the central facility; and (f) generating a latency map that associates message latencies with location using the initiation time and locations received from one or more of the vehicles.

According to another aspect of the invention, there is provided a method for monitoring data transfer performance. The method includes encoding a message requesting data from a vehicle with an initial time, sending the message from a central facility to a telematics unit, receiving the message at the telematics unit, recording the time at which the message is received at the telematics unit from the central facility, calculating a time delta between the initial time and the time at which the message is received at the telematics unit, determining the location of the vehicle at the time the message is received at the telematics unit, initiating a bidirectional data session between the telematics unit and the central facility, and sending a response that includes the requested data, time delta, and vehicle location from the telematics unit to the central facility.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The performance monitoring method described below attempts to provide information about the communication efficiency of messages to and/or from a vehicle, one example of which are "send and forget" messages. Generally, this method involves sending messages to a vehicle equipped with wireless telephony and wireless networking communications devices and noting the time at which the message was sent. The vehicle can then determine the time and location at which it receives the message and respond to a central facility, or call center, with another message containing the receiving time. After calculating the amount of time passed between sending the message and receiving the message, it is possible to form an opinion as to the efficacy of the message transmission and, in particular, the amount of latency involved. Using the position of the vehicle, it is possible to identify particular areas that are either more or less effective at transmitting messages than normal. Alternatively, it can be envisioned that messages could be sent from a vehicle to a central facility, where the vehicle notes the time and location at which the message was sent. Then, the central facility can receive the message and determine the time at which it received the message. After noting the time at which the message is received, the call center can send another message including the receiving time to the vehicle. At that point, it is possible to determine the efficacy of the message transmission as described above.

Communications System—

Figure 1:
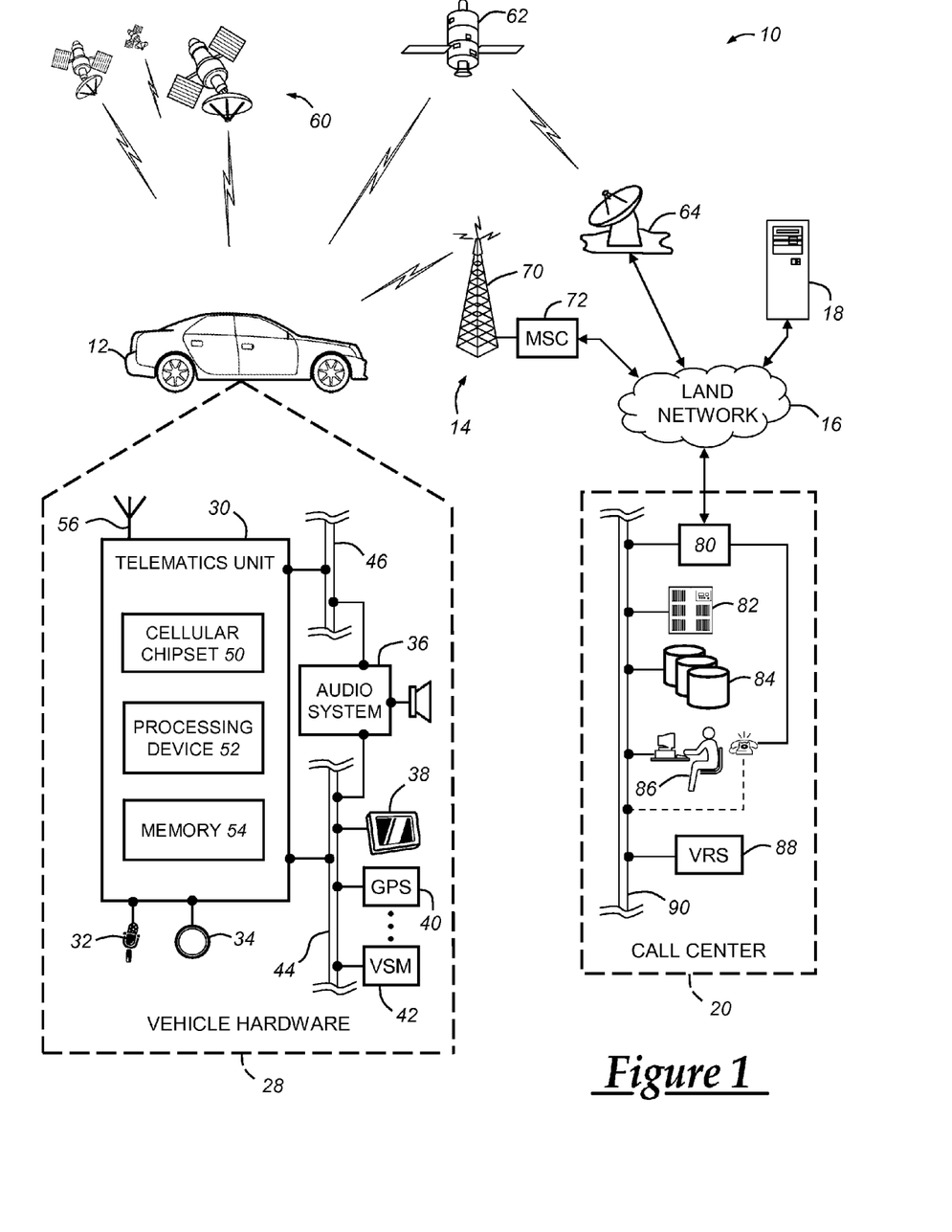
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, and WiMAX.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality.

This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20, also referred to as a central facility, is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Communications Method—

Figure 2:
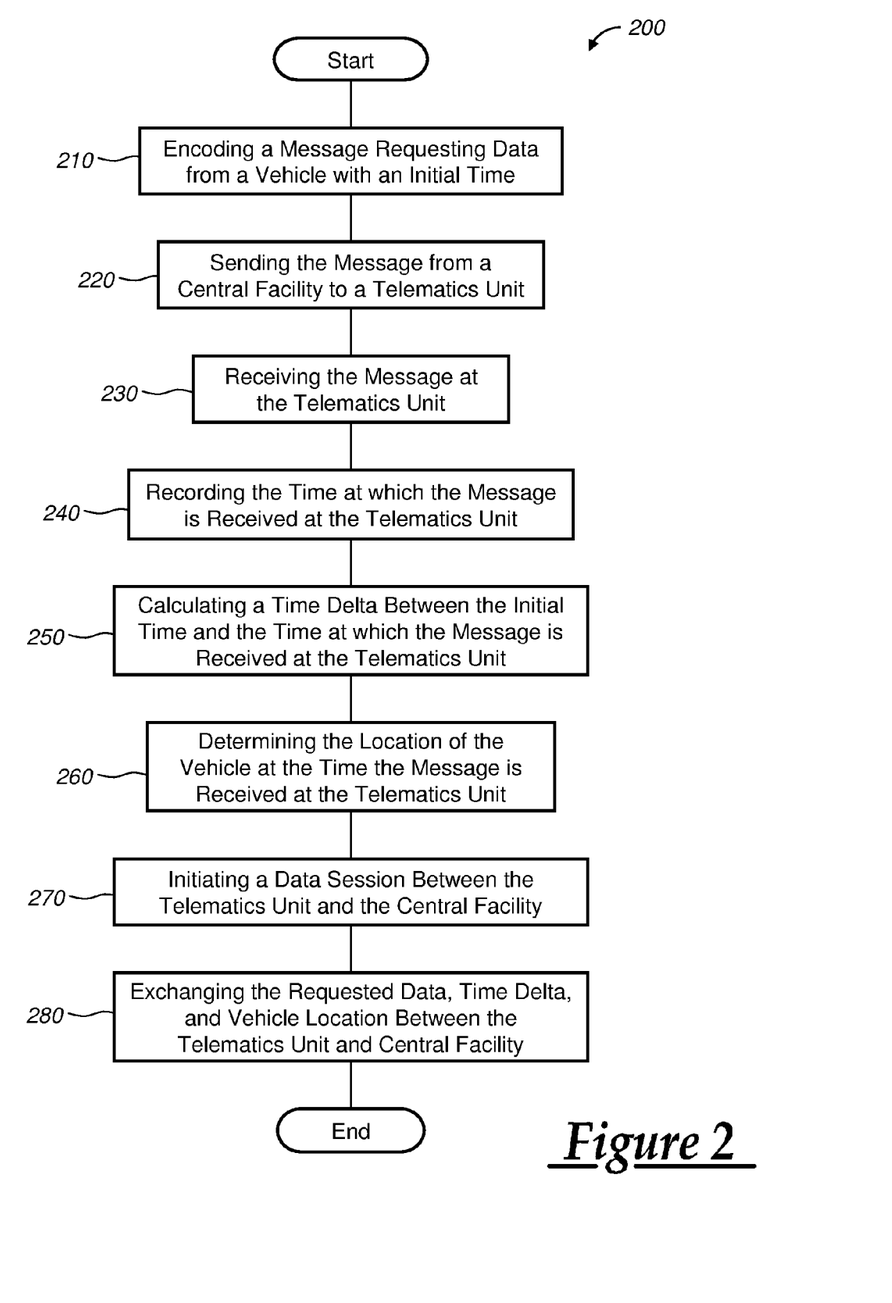
FIG. 2 is a flow chart depicting some of the steps of an embodiment of the monitoring method.

Referring to FIG. 2, the present communications method 200 can be used to provide information about the communication efficiency of messages sent to vehicles, and this information can in turn be used to control communications between the vehicle 12 and call center 20.

The method 200 begins at step 210, where a message requesting data from a vehicle 12 is encoded with an initial time (also referred to herein as an initiation time). The initial time is the time at which the message was generated and sent. The message requesting data can be of the type that does not provide a confirmation of reception. It can, for example, take the form of a short message service (SMS) message or circuit switched call. The message requesting data can request data relating to diagnostic reporting, such as data generated by one or more diagnostic modules. The message can also be any data capable of transmission via the telematics unit 30 over a wireless carrier system 14 related to vehicle operations. The initial time encoded in the message can be encoded either when the message is generated or when the message is actually sent. Either way, the payload of the message includes an initial time that establishes a time value to which a later recorded time value can be compared. Also, the vehicle 12 can be instructed by the message to obtain an IP address from the wireless carrier 14 and contact the central facility or call center 20 via a packet data session. The method then proceeds to step 220.

At step 220, the message is sent from the central facility to the telematics unit. The message can be sent from the central facility or call center 20 to a plurality of telematics units 30 via the wireless carrier system 14. The message can be sent or transmitted via any wireless carrier system 14, SMS transmission method, or circuit switch call and packet data session. The message can be generated automatically at preset times, or individual requests, such as by an engineer, may be effectuated on an ad hoc basis. The number of messages sent and the vehicles to which they are sent can vary as well. Controlling the number of messages sent and which vehicles receive the messages allows operators to create different samples of vehicle groups in different areas. These groups allow operators to pinpoint geographical areas where they want to gauge message transmission performance. For instance, sending messages from a central facility or call center 20 to groups of vehicles 12 registered in different pairs of states each hour allows the central facility to poll all vehicles registered in all fifty US states over the period of 25 hours. Sending messages according to a staggered schedule can help conserve system resources. But, if the central facility or call center 20 desired to send messages to vehicles 12 registered in a metropolitan city, messages can be sent only to those vehicles registered to owners residing in that city. Alternatively, the call center 20 could determine which vehicles 12 are located in the city via GPS coordinates generated by the telematics unit 30. Using GPS coordinates of vehicles 12 can help send messages to groups of vehicles 12 located in the city, but not registered to owners residing in the city. Simultaneously, vehicles 12 moved out of the city's geographical area but registered to owners residing in the city can be excluded. Ultimately, it is possible to increase or decrease the frequency with which messages are sent as conditions change. In operation, the central facility or call center 20 can automatically generate an SMS message and send it to a group of telematics-equipped vehicles 12. Before sending the message, it is encoded with the time at which the message is to be sent. The central facility or call center 20 then sends the message to a group of telematics-equipped vehicles 12. It can also be appreciated that the message can be sent without encoding the time in the message, while the time at which the message is sent is recorded in the database 84 at the call center 20. The method then proceeds to step 230.

At step 230, once the message is sent to a plurality of telematics unit equipped vehicles 12, it is thereafter received at the telematics unit 30 via the voice and/or data communications methods outlined above over the wireless carrier system 14. Generally, the telematics unit 30 will receive the message in a manner appropriate to the sending protocol. The message can have various types of data in the payloads so the telematics unit 30 should be able to read and act upon instructions contained in the payloads. The method then proceeds to step 240.

At step 240, the time at which the message is received from the central facility is recorded. This time is referred to as a receipt time. The determination and recording of a receipt time can be accomplished in a variety of ways. The time itself can be obtained from an internal clock located within the telematics unit 30, or from elsewhere on the vehicle, or can be obtained from the received GPS signal or the wireless carrier system 14. The receipt time can be stored on the vehicle, or can be reported to the call center 20 and stored in the database 84 for future use, and this can be done by encoding the receipt time onto a new message to send back to the central facility or call center 20. The method then proceeds to step 250.

At step 250, a time delta is calculated between the initial time and the receipt time. The time delta comprises latency information that is in the form of a message latency which represents the amount of elapsed time between the sending of the message from the call center and receiving the message at the telematics unit. In one example, a message is sent, encoded with the initial time at which it was sent, from a central facility or call center 20 to a telematics-equipped vehicle 12. The telematics unit 30 on the vehicle 12 receives the message and records the receipt time. The telematics unit 30 can then subtract the initial time from the receipt time and generate a time delta the represents the message latency. As used herein, the various times used in calculating latencies/time deltas may be in the form of a date plus 12-hr or 24-hr formatted time-of-day. Alternatively, an absolute time, representing for example, a number of seconds since a fixed point in time (e.g., since 0:0:00 Jan. 1, 2005) can be used so that simple subtraction of the various times can be used.

It can be appreciated that in another example, calculating the time delta could also be carried out at a central facility or call center 20 if the telematics unit 30 sent a message to the call center 20 with the necessary latency information. This information can include both the initial time and the receipt time. Alternatively, if the call center 20 recorded the initial time, including it in the message sent from the telematics unit 30 would be unnecessary. In that case, the latency information sent from the vehicle to the call center need only include the receipt time and some identifier or other information by which the call center can associate the received receipt time with the corresponding initial time for the same message. The calculated time delta can provide an accurate representation of the communication efficiency or general health of the wireless carrier system 14 by indicating the amount of message latency (i.e., how long it takes to transmit messages). For instance, relatively short or small time deltas or time deltas that correspond to benchmarks that represent average transmission times can indicate that the wireless carrier system 14 is functioning normally. On the other hand, if the central facility or call center 20 detects long or large time deltas or does not receive return messages from the telematics unit 30, it can indicate trouble or failures in certain areas of the wireless carrier system 14, or the wireless carrier system 14 as a whole.

At step 260, the location of the vehicle at the time the message is received at the telematics unit is determined. Knowing the location of the vehicle 12 can indicate wireless carrier system 14 performance according to geographic area. Vehicle location can be determined using GPS coordinates obtained from the GPS-based vehicle navigation module 40, or any other device capable of generating positional coordinates. The vehicle location can be stored in telematics memory 54 or other vehicle memory for inclusion with an outgoing message sent from the telematics unit 30. The vehicle location can be noted at substantially the exact time a message is received from a central facility or call center 20, but it can also be appreciated that a location of the vehicle 12 can be recorded after a predetermined amount of time has elapsed since the message has been received. The method then proceeds to step 270.

At step 270, a data session is initiated between the telematics unit and the central facility. The data session can be initiated to respond to the message sent from the central facility or call center 20. This session can be triggered anytime after noting the time the initial message is received at the telematics unit 30 and the vehicle position. The data session can be a bi-directional packet session as mentioned previously or short message system (SMS) using various TCP/IP or signaling system seven protocols. Depending on the application, such protocols include Short Message Peer-to-Peer Protocol (SMPP), External Machine Interface (EMI), or Machine Application Part (MAP). It can be appreciated that the bidirectional data session can utilize voice and/or data channels for exchanging data. The method then proceeds to step 280.

At step 280 the requested data, the time delta, and vehicle location is exchanged between the telematics unit to the central facility. Where all of this data is being sent from the vehicle to the call center, it can be aggregated together into a message sent from the vehicle. Alternatively, some of the information, such as the time delta, may have been generated at the call center, so that such information would instead be sent to the vehicle rather than from it. Using the aforementioned bidirectional data session, the telematics unit 30 can send a message from the vehicle 12 to the central facility or call center 20 that includes the vehicle location, data responding to the requested action, and latency information. Where the time delta (message latency) is determined at the call center, the latency information may contain the receipt time which is then used to determine the message latency at the call center. This message latency can then be provided back to the vehicle and/or can be used to generate a latency map for that particular vehicle or a generalized latency map for a number of vehicles, as discussed below in connection with FIGS. 3 and 4. In general, the determination of a latency map at the central facility or call center 20 involves analysis and organization of the latency data according to geographic location. For instance, organizing the message latencies and vehicle locations geographically can help engineers identify areas where a plurality of vehicles report above average time deltas. Engineers can then recognize that a particular geographical area may suffer from reduced communication capability and adjust accordingly.

This process of FIG. 2 in a like manner can be used to determine the latency of communications from the vehicle to the call center, whether via SMS messaging, packet data communications, or otherwise. Thus, for example, the vehicle 12 can initiate a communication with the call center 20, such as via packet data communication, and can record the initiation time of the communication along with vehicle location, and then, once the communication is established and ready for data transmission, the location and initiation time can be sent to the call center. The call center can then record the time at which the data was received and the difference between this data receipt time and the initiation time can be used to determine a message latency for the packet data connection. This message latency then be used to generate a latency map that has subsequent use in diagnosing weak communication spots (locations) and/or deciding whether a particular communication should be attempted based on vehicle location. Whether it is generated using call center to vehicle latencies or vehicle to call center latencies, or both, the latency map can be generated using only data received for a particular vehicle or using data aggregated from many vehicles. Furthermore, a message round-trip latency can be determined, by determining the elapsed time between the initiation of the first communication and the receipt of a response. For example, the vehicle can initiate a communication with the call center and use by the initiation time and the time at which a response is received to determine how long it takes to not only send a request, but to get a completed response.

Figure 3:
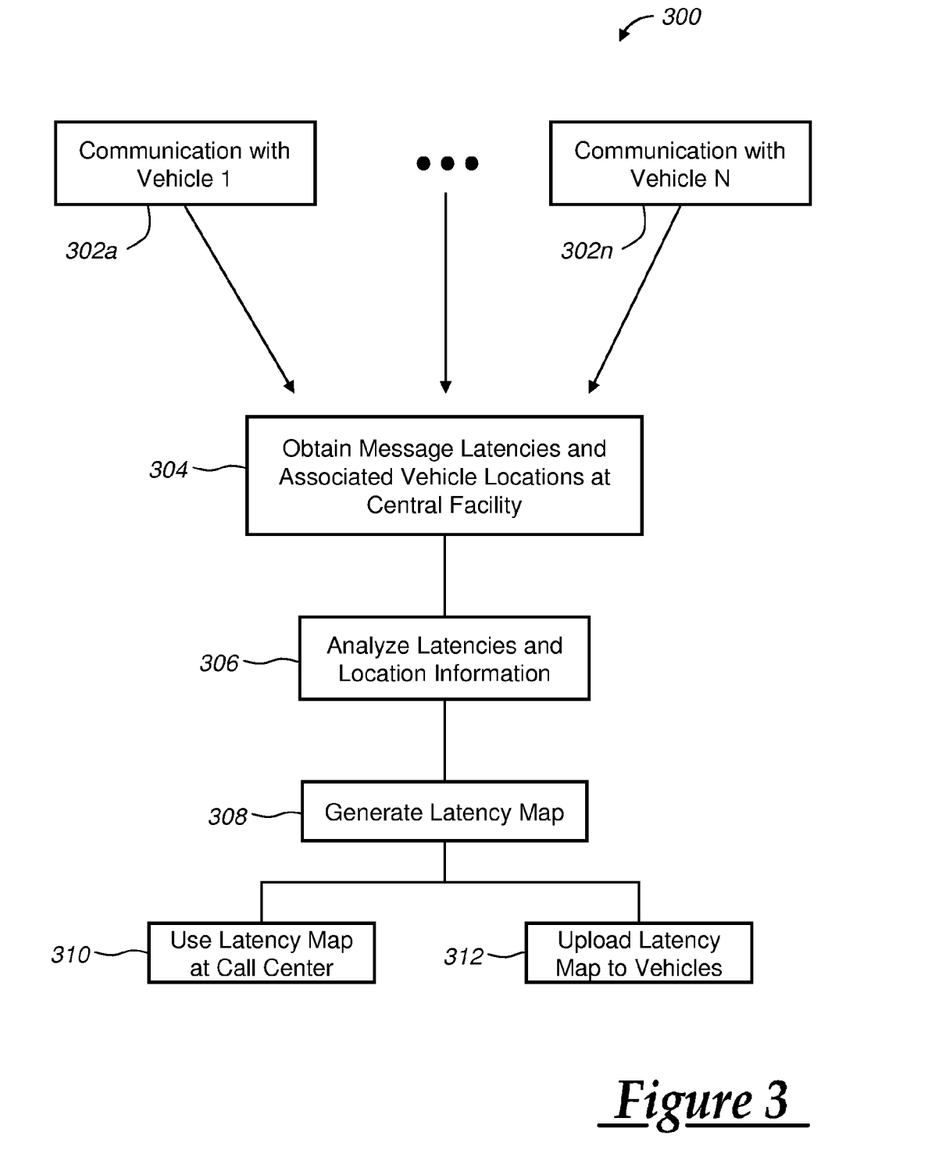
FIG. 3 is a flow chart of a method for monitoring communication with a plurality of vehicles and generating a latency map.

Turning now to FIG. 3, a method 300 is shown for generating a latency map from latency information received from a plurality of vehicles. The method begins at steps 302a through 302n where the central facility (e.g., call center 20) communicates with a plurality of vehicles 1 . . . N. These communications will not typically be at the same time, but can be over the course of many minutes, hours, days, or weeks. At step 304, the message latencies and vehicle locations are obtained, using any of the approaches described above. Then, at step 306, the message latencies and vehicle locations are analyzed and, at step 308, the result of this analysis is a latency map that correlates latency with location. Approaches and techniques for associating the message latency data with the location data will be known to those skilled in the art. Thereafter, the latency map can be used at the call center in deciding when and how to communicate with vehicles, as indicated at step 310 and/or it can be uploaded to the vehicles 12 and used by the vehicles in deciding how and when to communicate with the call center, as indicated at step 312. As will be appreciated, the call center might use a latency map indicative of latency v. location for messages sent to the vehicle, whereas the vehicle might use a latency map indicative of the latency v. location for messages sent from the vehicle to the call center.

Figure 4:
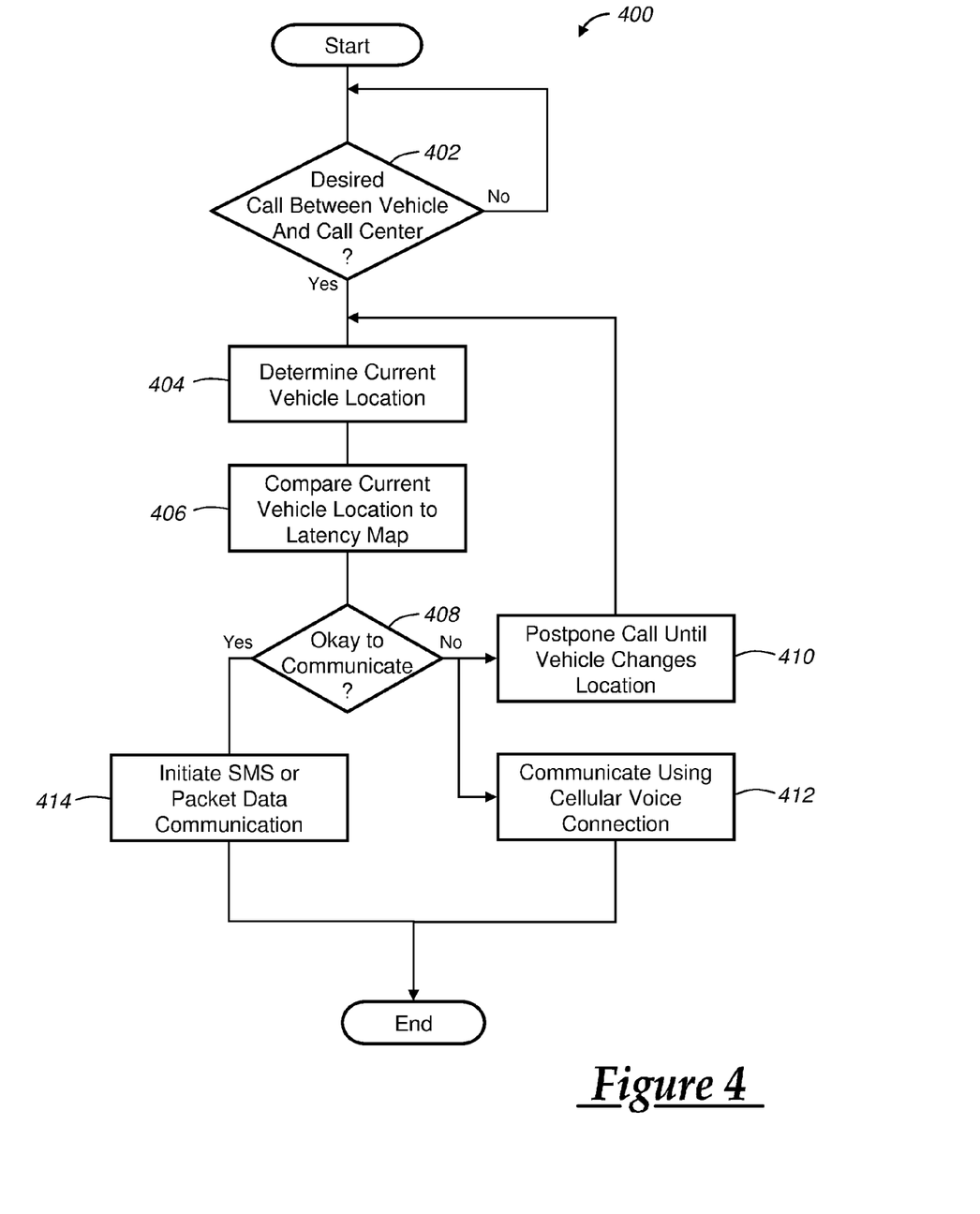
FIG. 4 is a flow chart of a method of using a latency map such as that generated using the method of FIG. 3.

FIG. 4 shows an example process 400 that uses a latency map in determining when and how to communicate between a vehicle and call center. This process could be carried out at the vehicle and/or separately at the call center. At step 402, the process waits until there is a desired communication to be carried out between the vehicle and call center. If so, the current vehicle location is determined, step 404. Again, this can be done at the vehicle using, for example, GPS module 40, or can be done at the call center using vehicle tracking or other means. Then, at step 406, the current vehicle location is compared to the latency map to determine whether an undesirably high latency is expected for the current vehicle location. If so, then at block 408, the process can either postpone the communication until the vehicle changes to a better location, step 410, or instead, another communication approach can be used, such as a cellular voice connection, as indicated at step 412. This step 412 can be used, for example, where an SMS or packet data connection is planned, but due to poor coverage, as indicated by the latency map, the system instead elects to communicate using another available approach (cellular voice call). Techniques for communicating data via a voice channel of a cellular network are known to those skilled in the art. Where the latency map indicates at step 408 that there is no expected communication problem, the process can instead move to step 414, where the desired SMS or packet data communication can be initiated.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the latency maps described herein associate vehicle location with message latency times. They can be implemented as a lookup table or in any other format suitable for use by the vehicle or call center. Alternatively, they could be implemented using a graphical representation that may be helpful for human review and analysis. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for monitoring data transfer performance, comprising the steps of:
   (a) receiving at a vehicle a message that is sent to the vehicle over a wireless communication system and that has associated with the message an initiation time at which the message was initially sent;
   (b) determining a receipt time at the vehicle indicating when the message was received at the vehicle;
   (c) sending latency information from the vehicle to a central facility, the latency information being associated with a message latency representing the difference between the receipt time and the initiation time;
   (d) determining location information associated with the vehicle's location at the time the message was received at the vehicle; and
   (e) associating the latency information with the location information, wherein the association provides a latency map that represents the association of the latency information with the location information.

2. The method of claim 1, wherein step (a) further comprises receiving the initiation time as a part of the message sent from the central facility.

3. The method of claim 2, wherein step (c) further comprises determining the message latency at the vehicle using the initiation time and the receipt time, and then sending the message latency from the vehicle to a central facility, whereby the message latency is the latency information that is sent from the vehicle.

4. The method of claim 2, wherein step (c) further comprises sending the initiation time and receipt time to a central facility for calculation of the message latency at the central facility, whereby the initiation time and the receipt time together are the latency information that is sent from the vehicle.

5. The method of claim 1, wherein step (c) further comprises sending the receipt time to a central facility for calculation of the message latency at the central facility, whereby the receipt time is the latency information that is sent from the vehicle.

6. The method of claim 1, wherein step (d) further comprises
   determining the location of the vehicle at the time the message is received at the vehicle; and wherein step (e) further comprises
   sending the location of the vehicle along with the latency information.

7. The method of claim 6, further comprising the steps of:
   obtaining the latency information and locations for a plurality of vehicles;
   calculating the message latencies for the plurality of vehicles;
   associating the message latencies with the locations for at least some of the vehicles;
   analyzing the message latencies and associated locations; and
   determining geographical areas in which longer message latencies occur relative to other geographical areas.

8. The method of claim 6, wherein the message received at the vehicle requests that a telematics unit initiate a data packet session between the telematics unit and a central facility and the step of sending the location of the vehicle involves using the data packet session to send the location.

9. The method of claim 1, wherein step (c) further comprises initiating a communication from the vehicle to a central facility and sending the latency information as part of a return message sent via the communication, and wherein the method further comprises the steps of:
   determining the location of the vehicle; and
   determining a return message latency indicative of the difference in time between when the communication was initiated and when the return message was received at the central facility; and
   providing information back to the vehicle indicative of the return message latency.

10. The method of claim 1, wherein step (a) further involves receiving an SMS message, wherein the message latency comprises an SMS latency.

11. A method for monitoring data transfer performance, comprising the steps of:
   (a) wirelessly initiating a communication from each of a plurality of vehicles to a central facility;
   (b) recording the initiation time at which each communication was initiated;
   (c) recording the location of the vehicle at the time the communication was initiated;
   (d) sending the initiation time and location to the central facility;
   (e) determining a message latency indicative of the difference in time between when the communication was initiated and when the initiation time and location was received at the central facility; and
   (f) generating a latency map that associates message latencies with location using the initiation time and locations received from one or more of the vehicles.

12. The method of claim 11, wherein step (f) further comprises the steps of:
   creating a database that organizes data for different geographical areas;
   categorizing the message latency for each vehicle located in the different geographical areas; and
   determining which geographical areas having larger message latencies.

13. The method of claim 11, further comprising the steps of:
   wirelessly receiving a return message at the plurality of vehicles from the central facility in response to the communication;
   establishing the time at which the return message was received at each vehicle; and
   calculating the amount of time elapsed between initiation of the communication and receipt of the return message.

14. The method of claim 13, wherein the communication and return messages are SMS messages.

15. The method of claim 13, wherein the communication and return messages are sent over at least one packet data session.

16. The method of claim 11, wherein step (f) is carried out using one or more initiation times and locations for a particular vehicle or is carried out using initiation times and locations for a plurality of vehicles.

17. A method for monitoring data transfer performance, comprising the steps of:
   (a) encoding a message requesting data from a vehicle with an initial time;
   (b) sending the message from a central facility to a telematics unit;
   (c) receiving the message at the telematics unit;

(d) recording the time at which the message is received at the telematics unit from the central facility;
(e) calculating a time delta between the initial time and the time at which the message is received at the telematics unit;
(f) determining the location of the vehicle at the time the message is received at the telematics unit;
(g) initiating a data session between the telematics unit and the central facility;
(h) exchanging the requested data, time delta, and vehicle location between the telematics unit and the central facility;
(i) creating a database containing different geographical areas;
(j) categorizing in the database the calculated time delta for each vehicle according to location in each geographical area; and
(k) determining geographical areas having large time deltas.

18. The method of claim 17, further comprising the step of sending the calculated time delta for each vehicle located in each particular geographical area to a wireless carrier provider.

19. The method of claim 17, wherein the step of calculating a time delta can take place either at the vehicle or at a central facility.

\* \* \* \* \*